United States Patent Office.

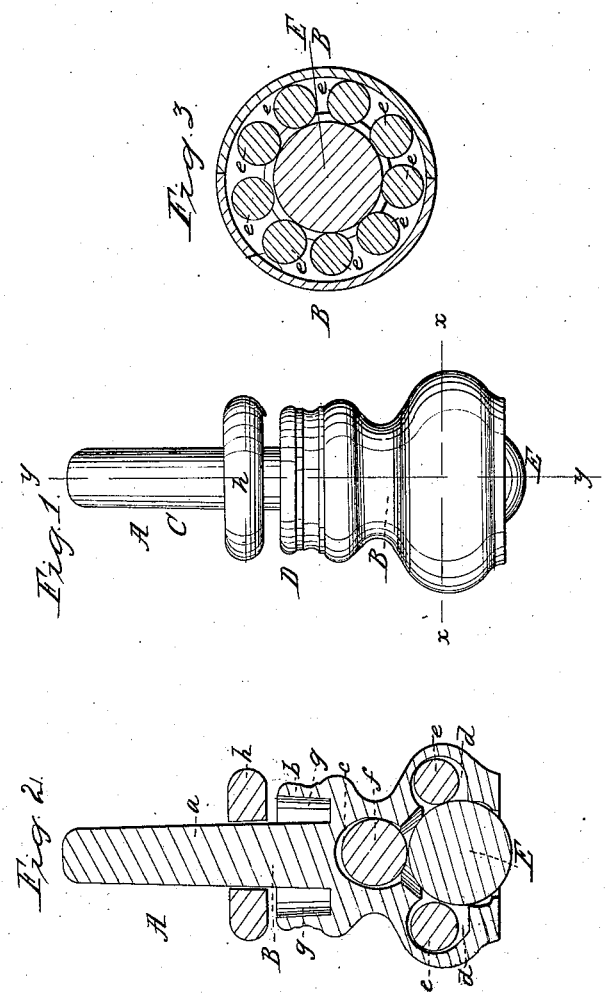

E. HAMBUJER, OF DETROIT, MICHIGAN.

Letters Patent No. 62,954, dated March 19, 1867.

IMPROVED CASTER FOR FURNITURE.

*The Schedule referred to in these Letters Patent and making part of the same.*

TO ALL WHOM IT MAY CONCERN:

Be it known that I, E. HAMBUJER, of Detroit, in the county of Wayne, and State of Michigan, have invented a certain new and useful Improved Caster Roller; and I do hereby declare the following to be a full, clear, and exact description of the nature thereof, which will enable others skilled in the art to which it appertains to fully understand and construct the same, reference being had to the accompanying drawings, making part of this specification, in which—

Figure 1 is a side view of a roller illustrating my invention.

Figure 2 is a transverse vertical section of the same in the line $y\,y$, fig. 1.

Figure 3 is a horizontal section in line $x\,x$, fig. 1.

Similar letters of reference indicate corresponding parts in the several figures.

The object of my invention is to produce a caster roller having a rolling ball, in such a manner that friction is greatly overcome, by means of friction balls arranged relatively to the main rolling ball, and it consists furthermore in the peculiar construction of the box or casket for receiving the balls, forming ready means of inserting them in their chambers, as also of retaining the complete caster in the opening of the leg of the article of furniture to which it is to be applied, as will be hereinafter more fully described.

A represents the box or body of my caster, formed of two sections B, of uniform shape and size, each having a semi-cylindrical shank, $a$, and flange, $b$, cast therewith at their upper ends, forming, when together, a complete shank, C, and flange D, as shown in fig. 1 of the drawings. A channel, $g$, is formed between the flange and shank, the use of which will be hereinafter explained. On the inner face of each section is formed a chamber, $c$, opening downwards into a channel or groove, $d$. The lower end of the sections is open, through which opening protrudes the main roller ball E. The groove $d$ receives a series of friction balls, $e$, which are placed nearly equatorial with the roller ball E, and are in contact therewith. The chamber $c$ receives the friction ball $f$, which is placed just above the roller ball, and is likewise in contact with it. The sections are placed properly together with the balls enclosed therein in their relative chambers, and the shank is inserted in the opening in the leg of the article of furniture to which it is to be applied, and the lower portions of said leg will drop or fit into the channel $g$, and rest on the bottom of the channel $g$, and securely hold the sections together. On moving or rolling the furniture, the main roller will revolve, the friction will be taken simultaneously by the equatorial balls $e$ and the top ball $f$ at every point of rotation, and thus the main roller ball will bear only against the other balls and not come in contact with any part of the box which would be likely to cause friction. The balls may be made of iron, brass, glass, or any like suitable material. The ring $h$, which encircles the shank C, illustrates the mode of holding the sections together, being but a substitute for the leg of an article of furniture.

Having thus described my invention, what I claim as new, and desire to secure by Letters Patent, is—

The equatorial balls $e$, moving round the entire circumference of the grooved chamber $d$, in combination with the top ball $f$, operating relatively with the roller ball E, substantially as described for the purpose specified.

To the above I have signed my name this 27th day of February, 1867.

E. HAMBUJER.

Witnesses:
   F. H. WEAVER,
   JOHN A. WIEDERSHEIM.